(12) United States Patent
Wimperis et al.

(10) Patent No.: US 7,289,693 B2
(45) Date of Patent: Oct. 30, 2007

(54) SYSTEM AND METHOD FOR PRODUCING OPTICAL CIRCUITS

(75) Inventors: Christopher Wimperis, Ontario (CA);
William McCreath, Stittsville, CA (US); William Eccleshall, Ottawa, CA (US); Mandeep Singh, Ottawa, CA (US); Christopher Becker, Greely, CA (US); Richard A. Neily, Kars, CA (US); Kurt Pelsue, Wayland, MA (US)

(73) Assignee: GSI Group Corporation, Billerica, MA (US)

( * ) Notice: Subject to any disclaimer, the term of this patent is extended or adjusted under 35 U.S.C. 154(b) by 0 days.

(21) Appl. No.: 11/535,264

(22) Filed: Sep. 26, 2006

(65) Prior Publication Data
US 2007/0019903 A1    Jan. 25, 2007

Related U.S. Application Data

(60) Division of application No. 10/114,717, filed on Apr. 2, 2002, now Pat. No. 7,146,064, which is a continuation-in-part of application No. 10/034,638, filed on Dec. 21, 2001, now abandoned.

(51) Int. Cl.
*G02B 6/12*     (2006.01)

(52) U.S. Cl. ..................................... 385/14
(58) Field of Classification Search .............. 385/14; 156/250
See application file for complete search history.

(56) References Cited

U.S. PATENT DOCUMENTS

| | | | |
|---|---|---|---|
| 4,172,663 A | 10/1979 | Byer et al. | |
| 4,830,451 A | 5/1989 | Stone | |
| 5,212,584 A * | 5/1993 | Chung | 359/260 |
| 5,321,539 A | 6/1994 | Hirabayashi et al. | |
| 5,410,625 A | 4/1995 | Jenkins et al. | |
| 5,558,934 A | 9/1996 | Rowell et al. | |
| 5,656,553 A | 8/1997 | Leas et al. | |
| 5,790,502 A * | 8/1998 | Horinouchi et al. | 369/112.09 |

(Continued)

FOREIGN PATENT DOCUMENTS

WO    WO0177626    10/2001

(Continued)

OTHER PUBLICATIONS

Jerman et al., "Miniature Fabry-Perot Interferometers Micromachined in Silicon for Use in Optical Fiber WDM Systems," International Conference on Solid State Sensors and Acuators, New York, IEEE, US vol. Conf. 6, 24, Jun. 24, 1991.

(Continued)

*Primary Examiner*—Ellen E. Kim
(74) *Attorney, Agent, or Firm*—Gauthier & Connors, LLP

(57) ABSTRACT

A method of fabricating a plurality of composite optical assemblies is disclosed. Each optical assembly includes a first optical element and a second optical element. The method includes the steps of providing a first composite substrate that may be divided into a plurality of first optical elements and forming on an exposed surface of the first composite substrate a second composite substrate that may be divided into a plurality of second optical elements, the first and second composite substrates providing a composite structure.

21 Claims, 12 Drawing Sheets

U.S. PATENT DOCUMENTS

| | | | |
|---|---|---|---|
| 5,825,792 A | 10/1998 | Villeneuve et al. | |
| 5,828,689 A | 10/1998 | Epworth | |
| 5,846,638 A * | 12/1998 | Meissner | 428/220 |
| 5,903,393 A | 5/1999 | Kalibjian | |
| 5,970,076 A | 10/1999 | Hamada | |
| 6,096,155 A | 8/2000 | Harden et al. | |
| 6,181,726 B1 | 1/2001 | Lunt | |
| 6,186,937 B1 | 2/2001 | Ackerman et al. | |
| 6,208,316 B1 | 3/2001 | Cahill | |
| 6,215,801 B1 | 4/2001 | Ackerman et al. | |
| 6,215,802 B1 | 4/2001 | Lunt | |
| 6,222,861 B1 | 4/2001 | Kuo et al. | |
| 6,243,403 B1 | 6/2001 | Broustin et al. | |
| 6,246,480 B1 | 6/2001 | O'Brien | |
| 6,276,806 B1 | 8/2001 | Skillicom et al. | |
| 6,278,681 B1 * | 8/2001 | Nagano | 369/112.16 |
| 6,373,872 B2 | 4/2002 | Deacon | |
| 6,436,793 B1 | 8/2002 | Kneezel et al. | |
| 6,451,150 B2 | 9/2002 | Feldman et al. | |
| 6,511,571 B2 * | 1/2003 | McCallion et al. | 156/250 |
| 6,600,601 B1 * | 7/2003 | Ikari et al. | 359/484 |
| 6,621,630 B2 * | 9/2003 | Iwatsuka | 359/484 |
| 6,661,818 B1 | 12/2003 | Feldman et al. | |
| 7,039,280 B2 * | 5/2006 | Hata et al. | 385/50 |
| 2002/0045104 A1 * | 4/2002 | Efimov et al. | 430/2 |
| 2004/0080834 A1 | 4/2004 | Thompson | |

FOREIGN PATENT DOCUMENTS

| | | |
|---|---|---|
| WO | WO0188604 | 11/2001 |

OTHER PUBLICATIONS

Jahns, "Planar Packaging of Free-Space Optical Interconnections," Proceedings at IEEE, Vo. 82, No. 11, Nov. 1999, pp. 1622-1630.

Schamschula et al., "Regular Geometries For Folded Optical Modules," Applied Optics, vol. 34, No. 5, pp. 816-827. Feb. 1995.

Schamschula et al., "Space-Filling Modular Optics," Optics Letters, vol. 19, No. 10, May 1994, pp. 688-691.

Popeleck et al., "X-Cube, An Integrated Bulk Optic Filtering Device," NEC Research Institute, Princetion, NJ, Jan. 11, 2001.

Sun et al., "Polymeric Waveguide Prism-Based Electro-Optic Beam Deflector," Society of Phot-Optical Instrumentation Engineers, Jan. 4, 2001, pp. 1-2.

* cited by examiner

SYSTEM AND METHOD FOR PRODUCING OPTICAL CIRCUITS

The present application is a divisional application of U.S. Ser. No. 10/114,717 filed Apr. 2, 200, Now U.S. Pat. No. 7,146,064 which is a continuation-in-part application of Ser. No. 10/034,638 filed with the U.S. Patent and Trademark Office on Dec. 21, 2001 now abandoned.

FIELD OF THE INVENTION

The invention generally relates to the fabrication of optical circuits, and in particular relates to the fabrication of small scale optical circuits such as those including micro etalons.

BACKGROUND OF THE INVENTION

Optical circuits typically include a group of individual and isolated optical elements that are arranged on a base, and that together perform an optical operation on a radiation beam or ray that passes through or is reflected by the optical elements. Each individual element is typically supported on the base by a mounting structure that may support a single optical element or a group of optical elements with respect to the base. It is customary that at least some of the individual mounting structures will include a capability for moving or adjusting a position of the optical element in one or more degrees of freedom at a final assembly step. The adjustments may be used to align individual elements along a common optical axis and to direct an output beam or ray from the optical circuit to a desired target location. Such alignments may also be used to direct back-reflections from optical surfaces away from the radiation source, e.g., a laser, so that the back-reflection do not affect the laser cavity output.

In many cases, alignment of the optical elements is so demanding that the optical elements cannot be oriented without adjustment, often to sub micron dimensions. Attempts to orient optical elements by simply machining or otherwise forming an optical element mounting surface to the tolerances required for pre-alignment of the optical element have not been satisfactory because tolerances achievable by metal forming techniques used to locate the optical element mounting surface fall far short of the tolerances that are routinely achievable using alignment and instrument feedback from, for example, a beam position detector.

For example, as shown in FIG. 1 a conventional frequency locker optical circuit includes a laser source 1, a lens 2, a first beam splitter 3, a second beam splitter 4, an etalon 5, a wavelength selective filter 6, a first detector 7, a second detector 8, and a controller 9. Generally, a small portion of the laser signal is passed through each of the etalon 5 and the filter 6 to determine the precise wavelength of the signal being output from the laser. If the laser needs to be adjusted, the controller 9 automatically adjusts the laser to return it to the desired frequency. As shown in FIG. 1 many, if not all, of the optical elements are adjustable with respect to the base in at least one and possibly three dimensions to ensure that the optical path is precisely aligned. This is critical, at least in part, due to the use of the etalon.

Etalons generally include a pair of optical surfaces that are separated from one another by a specific distance. The space or cavity between the optical surfaces may include any material transmissive and non-corrupting to the light transiting the gap, which may be solid, liquid or gas as in the case of air. Sealed etalons, which provide that the space between the optical surfaces is enclosed, may include trapped gas or vacuum or any desired pressure. If the etalon is slightly misaligned, its operational characteristics will completely change to a different frequency because the optical path length through the cavity will change. Optical circuits, therefore, that include etalons must be very precisely aligned to tolerances that far exceed assembly tolerances. Etalons may be used for a variety of optical applications, including variable wavelength filtering (by slightly rotating the etalon, changing its temperature, or otherwise varying the optical path on the cavity), optical filtering of certain wavelengths, and optical wavelength measuring systems. The precise alignment of the etalon in the optical circuit is critical and the fabrication of optical circuits using micro etalons remains time consuming and expensive.

It is known that conventional optics forming methods such as surface grinding and polishing, as well as well known optical surface measurement techniques such as using interferometers, can be employed to position optical surfaces to a much higher degree of accuracy than can be done by conventional metal forming techniques. Such optics forming methods and measurement techniques, however, are typically unsuitable for use in adjusting an optical element after the element is positioned on a base.

Optical circuits are utilized in many fields and are in wide use in laser systems, imaging systems, fiber optic communication systems and in optical disk devices such as compact disk memory, audio and video recording and playback systems. An optical circuit may include as few as two elements or may include tens of elements working together to perform individual optical operations. For example, a simple two element optical circuit may comprise a single surface of a flat glass plate having an optical coating thereon. In this case the optical coating may comprise an anti-reflection coating for performing a first optical operation and the glass having an index of refraction, which is different than air, performs a second optical operation on a beam passing through the glass.

Optical circuit examples may include beam isolators, a plurality of beam splitters in series, beam expanders, beam directing devices e.g. utilizing a plurality of individual mirrors, wave lockers used to select a laser output frequency etc.

There is a need therefore, for a system and method for fabricating optical circuits that are pre-aligned and pre-tested and require a minimum of alignment steps when installed in a larger optical system. Moreover, there is need to build and align such systems utilizing fabrication tolerances that are readily available by conventional optics fabrication techniques.

More recently, there is a need for optical circuits having miniature optical elements, especially for use in telecommunication systems utilizing fiber optics. In recent laser systems, beam diameters may range from about 0.01 mm near a work surface, to as large as 15.0 mm or more in other parts of the overall system. Accordingly, individual optical elements such as lenses, mirrors, beam splitters, prisms, filters, and the like, may only require an optical aperture in the range of about 1-15 mm in diameter. Moreover, it may be beneficial that the size of each individual element be, e.g. 1×1 mm to about 15×15 mm to reduce the size of the optical circuit or to reduce weight.

It is also a typical problem that individual miniature optical elements are difficult to fabricate, difficult to measure, difficult to handle, difficult to mechanically mount and align and difficult to coat with optical coatings. In fact individual optical elements are sometimes made larger than necessary because the larger elements can be made for less cost and are easier to manipulate. An example of a miniature optical element is disclosed in U.S. Pat. No. 6,276,806, which discloses a method of fabricating micro etalons (of about 10 mm by 10 mm by 10 mm) that may be used in a variety of optical circuits. Such micro etalons, however, require very delicate and precise handling in fabricating optical circuits, and still must be adjusted once mounted to a base. Also, the micro etalon fabrication techniques disclosed in U.S. Pat. No. 6,276,806, are not readily adaptable to the manufacture of sealed micro etalons. The manufacture of sealed micro etalons remains time consuming and expensive, requiring very small parts to be assembled in a controlled environment in which the desired gas and pressure are maintained in a controller fashion.

There is, therefore, a further need to provide systems and methods for fabricating miniature optical elements of high quality and low cost and weight.

There is also a need for a system and method for economically and efficiently fabricating a large number of optical circuits such as those containing micro etalons.

There is also a need for a system and method for economically and efficiently fabricating sealed micro etalons.

There is also a need for a system and method for economically and efficiently fabricating very precise micro etalons.

SUMMARY OF THE INVENTION

The invention provides a method of fabricating a plurality of composite optical assemblies, wherein each optical assembly includes a first optical element and a second optical element. The method includes the steps of providing a first composite substrate that may be divided into a plurality of first optical elements and forming on an exposed surface of the first composite substrate a second composite substrate that may be divided into a plurality of second optical elements, the first and second composite substrates providing a composite structure.

The invention also provides an optical circuit including a plurality of discrete optical elements that are in optical contact with one another. The optical circuit is formed, at least in part, by dividing a composite optical structure into a plurality of optical circuits.

BRIEF DESCRIPTION OF THE DRAWINGS

The following description may be further understood with reference to the accompanying drawings in which.

DETAILED DESCRIPTION OF THE ILLUSTRATED EMBODIMENTS

The invention provides systems and methodologies for fabricating optical circuits as well as for fabricating certain optical elements such as micro etalons. Micro etalons are in high demand in optical communication applications such as fiber optic communication systems. Each etalon provides an optical element that functions as a narrow band-pass filter. The etalon may be used to transmit only a very narrow band of optical frequency by filtering out other optical frequencies from an optical beam or signal having a broadband frequency or wavelength spectrum. Etalons may also be used as a background noise filter.

The micro etalons of the present invention comprise a fixed optical path length, or optical cavity length, and a Fabry Perot interferometer having opposing and substantially parallel partially reflective surfaces bounding an air space, a solid transparent optical material or gas or vacuum filled cavity. The cavity length is defined by the spacing between the opposing surfaces. Each surface may include an optically reflective coating or other coating for enhancing the performance of the etalon. The etalon cavity is constructed to transmit substantially all of an optical beam having a wavelength or optical frequency that leads to constructive interference within the cavity. Accordingly, transmission maxima occur at discrete periodic wavelength intervals separated by a free-spectral-range (FSR) or separation between the transmission peaks. The free spectral range of an etalon is governed by the following relationships:

$$FSR(cm^{-1}) = \frac{1}{2}\, dn$$

$$FSR(nm) = \lambda^2/2dn$$

$$FSR(Hz) = c/2dn$$

Where d is the cavity length, n is the refractive index of the cavity material, (1.0 for a vacuum), and c is the speed of light.

Figure 1:
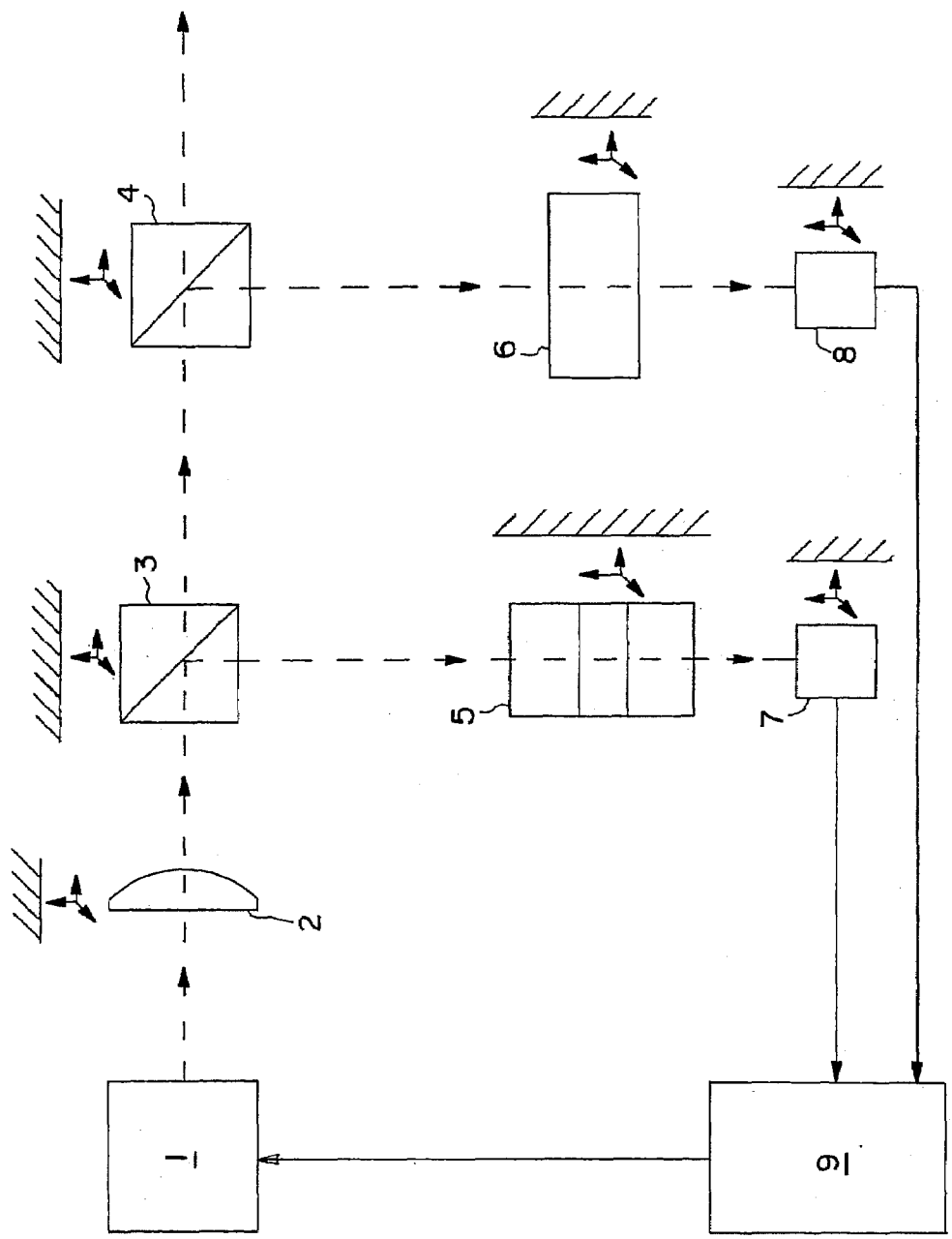
FIG. 1 shows a diagrammatic view of an optical circuit that is fabricated in accordance with the prior art.
Figure 2:
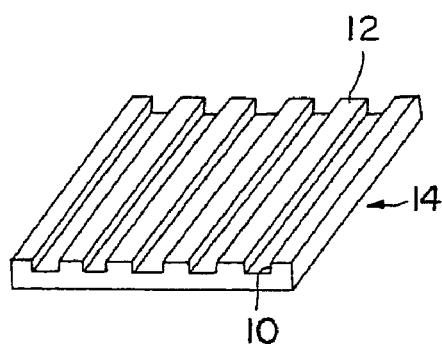
FIG. 2 shows an illustrative view of a spacer substrate used in accordance with an embodiment of the invention.
Figure 3:
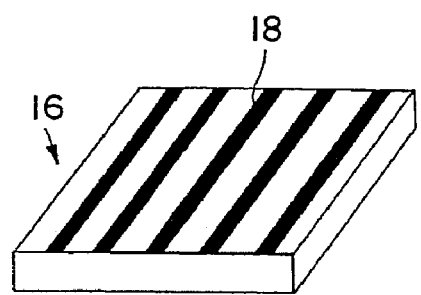
FIG. 3 shows an illustrative view of a first substrate used in accordance with an embodiment of the invention.
Figure 4:
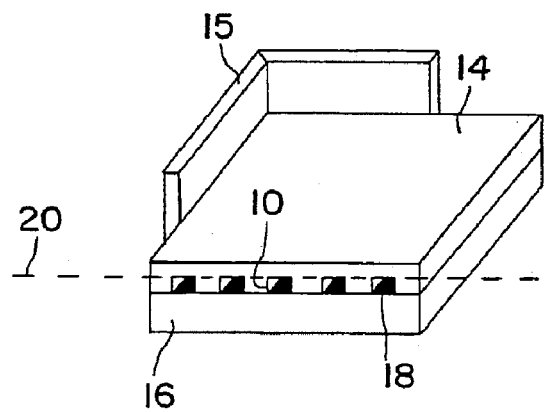
FIG. 4 shows an illustrative view of the spacer substrate of FIG. 2 placed onto the first substrate of FIG. 3.
Figure 5:
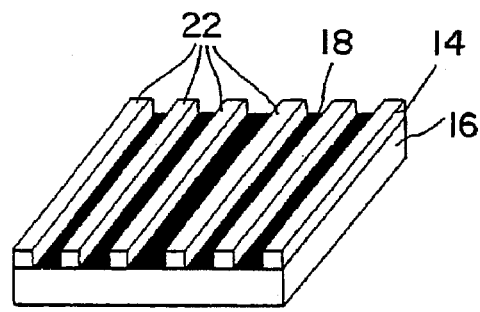
FIG. 5 shows an illustrative view of the composite of FIG. 4 with a portion of the spacer substrate removed by grinding.

With reference to FIGS. 2-9, a method of forming a plurality of micro etalons simultaneously is described. An etalon blank is formed by initially cutting grooves 10 into a surface 12 of a spacer substrate 14 as shown in FIG. 2. The spacer substrate 14 may be formed of an ultra-low expansion material such as Schott glass, and the grooves may be ground to a depth (e.g., 5 mm) that is greater than the height of the desired final etalon cavity length. The spacer may be a 50 mm by 50 mm square, having a thickness of 7-10 mm and its top surface 12 is polished optically flat (e.g., to within less than about 50 nm) and smooth (less than about 0.5 nm rms). Next, a first substrate 16 is coated with stripes 18 of a reflective material (of any reflectivity) as shown in FIG. 3. The first substrate 16 may be, for example, silicon dioxide ($SiO_2$), and may be 50 mm by 50 nm by 10 mm with its top surface polished optically flat (e.g., to within less than about 50 nm) and smooth (less than about 0.5 nm rms). The stripes 18 correspond to the spacing of the grooves 10 and may be fabricated with well known mask or lithography techniques. As shown in FIG. 4, the composite of the first substrate 16 and the spacer substrate 14 is formed by turning the spacer substrate 14 upside down and optically contacting it on the first substrate 16. The substrates 14 and 16 are each aligned at centering corners thereon by a fixed block 15 as shown in FIG. 4. The optical contacting here occurs between the uncoated portions of the blank 16 and the top surface 12. It is noted that the entire surface of the blank 16 may be optically contacted, or in certain embodiments, the contacting surfaces may be uncoated. Optical contacting occurs when two compatible materials that are sufficiently clean, flat and smooth are brought in intimate contact with one another and the materials are held together by molecular attraction without any intervening adhesive forming a solid and stable bond. The exposed (non-grooved) surface of the spacer substrate 14 is then ground away to remove a portion of the substrate 14 down to the line generally indicated at 20 in FIG. 4 to expose the grooves as shown in FIG. 5. The thickness of the spacers 22 in FIG. 4 may be, for example, 3 mm. The spacer thickness is carefully ground and polished to provide a uniform spacer height over the entire blank since the spacer height will become the etalon cavity length as will be described below in more detail. Moreover, the spacer height is finally polished to the desired cavity length as best as can be measured by shop instruments (about 0.12 µm).

Figure 6:
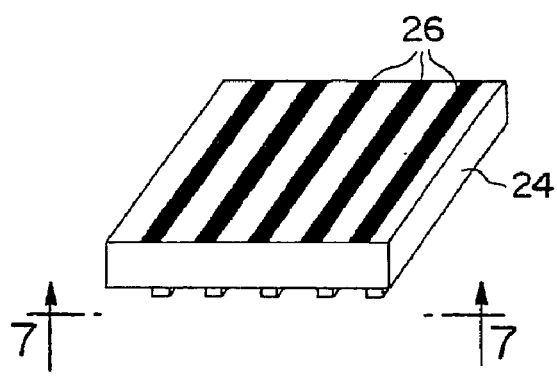
FIG. 6 shows an illustrative view of a second base substrate; used to form an etalon in accordance with an embodiment of the invention.
Figure 7:
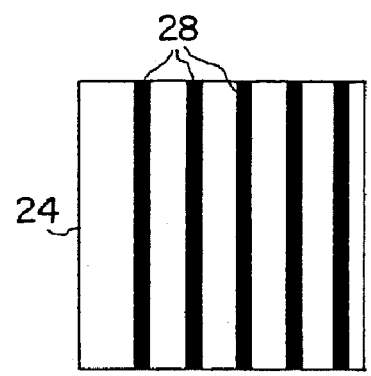
FIG. 7 shows an illustrative bottom view of the second base substrate of FIG. 6 taken along line 7-7 thereof.

A second substrate 24 as shown in FIG. 6 is then coated on its polished surface with reflective material 26 in stripes similar to the first substrate 16 shown in FIG. 3 except that the second substrate 24 may be thinner by a few mm than the first substrate 16 (e.g., about 7 mm). In one embodiment, the opposite side of the second substrate 24 may be coated with stripes 28 of filter material as shown in FIG. 7 that serves as a wavelength selective filter, notch filter or other optical frequency selecting or absorbing coating. In other embodiments, the filter material coating may be applied to either of the opposing surfaces of the substrates 16 and 24 adjacent the spacer 22, or to one of the adjacent surfaces of the spacer 22. The presence of such coating should not adversely affect the optical contacting of the substrates to one another.

Figure 8:
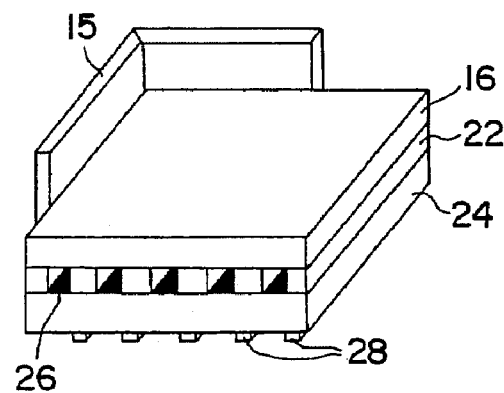
FIG. 8 shows an illustrative view of the composite of FIG. 5 placed on top of the second base substrate of FIG. 6.

As shown in FIG. 8, the composite of FIG. 5 is then inverted and optically contacted onto the second substrate 24. Again, each of the substrates 16, 22, 24 is aligned at centering corners thereon by the block 15. Accordingly, FIG. 8 depicts a composite optical structure 25 comprising a plurality of optical circuits formed simultaneously according to the method described above. The structure 25 may be separated into individual separate optical elements in several ways, as will be described below. The composite structure 25 may be spatially divided into rows and columns of separate elements before actually separating the elements such that regions of the composite structure 25 may be tested before separating the elements from the composite structure 25. For example, the optical performance of selected regions of the composite element 25 may be individually measured in a test apparatus such as the apparatus and test method that is described in related U.S. patent application Ser. No. 09/872,303 filed on Jun. 1, 2001, which is commonly assigned with the present application. Accordingly, the composite substrate 25 may be measured at a variety of locations to actually measure the etalon cavity length, the FSR and other performance characteristics of what will become individual micro etalon or optical circuits. One aspect of the present invention is that if desired, the second substrate 16 may be separated from the composite 25 to permit further polishing of the spacers 22 to actually adjust the optical performance of various regions of the composite element 25. As described above, the substrate 16 is made thinner than the substrate 24 so that the substrate 16 will be more flexible than the substrate 24. This allows substrate 16 to be readily removed from the composite 25 without danger of breaking the optical contact between spacers 22 and the substrate 24.

Thus according to the present invention, a sampling of locations in representative regions of the composite element 25 may be made to create a map of corrective polishing that may be needed to provide uniform performance over each region of the composite element 25. In certain embodiments, automated measurement algorithms may be used to measure the performance of each region of the composite element 25 and interpolate between measured data points to accurately map the surface of the spacers to ensure smooth and accurate polishing of the spacers to provide the desired uniform optical cavity length throughout. After further polishing the spacers 22, the substrate 16 is again optically contacted onto the spacers 22 for re-measurement of the performance of each region.

In various embodiments, the transmission amplitude filter coating 28 may be applied to either of the opposing surfaces on the substrate 16 or 24. Coatings must be applied after the surface is polished to the required specifications for flatness and smoothness. The optical coating stripes are applied using a metal or other suitable coating mask. The coatings may be applied in a vacuum chamber by vapor deposition, sputtering or any other suitable coating method. In an embodiment in which the coating 28 is provided inside of the composite 25, the top and bottom substrates may be reduced in thickness once the spacer substrate is finally polished. In particular, once all regions of the composite element 25 are meeting the desired optical performance characteristics, the top and bottom surfaces of the composite 25 may then be ground to a smaller thickness (e.g., reduced to 1 mm to 2 mm each) as desired. The opposing surfaces of the substrates 16 and 24 may be polished to be flat to within 50 nm and smooth to about 0.5 nm rms, and are made to be parallel to within about 50 nm.

The substrate 24 should preferably start out having a relatively large thickness to aid in the manufacturing process by providing rigidity (e.g., originally 10 mm), and the substrate 16 should start out being relatively thinner (e.g., 7 mm) so that it may be peeled off of the spacers to permit re-grinding of the spacers and the be easily repositioned on the spacers. Preferably, one or two reference edges of each substrate are aligned at each step of the manufacturing process. The substrates 14, 16 and 24 are joined to one another by optical contacting. The surfaces, therefore, must be sufficiently flat and smooth to permit optical contacting, which occurs when the surfaces are lightly pressed together such that the air between the surfaces is forced out and a glass to glass bond is achieved at an atomic level. Although the substrates may be separated with force, there is no need for glue or clamping or fastening during manufacturing.

Figure 9:
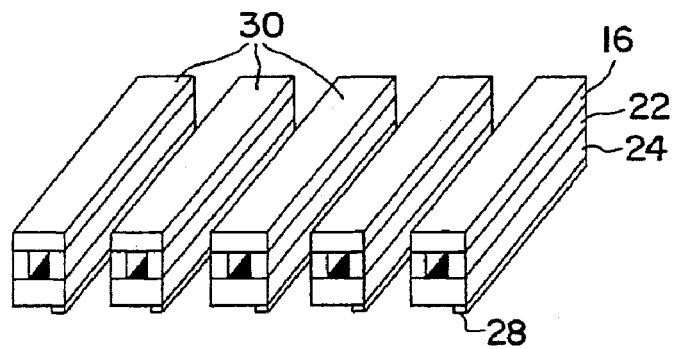
FIG. 9 shows an illustrative view of the composite of FIG. 8 divided into a plurality of composite substrates.
Figure 14:
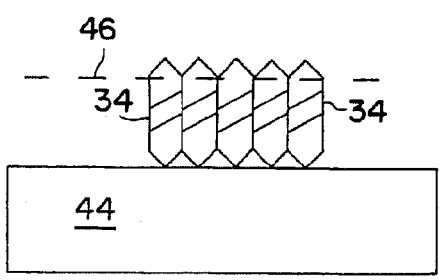
FIGS. 14 and 15 show illustrative views of sets of five composite substrates being processed together following the stages shown in FIGS. 12 and 13.

As shown in FIG. 9, the composite structure shown in FIG. 8 is then divided across the width of the structure, providing a plurality of composite optical assemblies 30, each of which includes a portion of the second substrate 24, a pair of parallel spacers (formed by dividing each spacer 22 in half lengthwise), and a portion of the first substrate 16. Each of these optical assemblies 30 provides a very wide etalon including spacers 22 and having air in the etalon space or gap that is open at either end. The height of the air gap in the etalon is determined by the distance 20 (in FIG. 4) to which the spacer substrate thickness is reduced. In various embodiments, if the spacers do not remain sufficiently stationary during grinding once separated from one another, a wax or other temporary fixing material may be introduced into the grooves 10 in FIG. 4 prior to grinding. The wax or fixing material may then be removed through either the application of heat or by the use of a degreasing material. The reflective coatings 18 and 26 provide the reflective surfaces of each etalon, and each reflective coating may be applied in 2-20 coatings to a thickness of about, for example, 1-5 microns. The air space height plus the reflective coating optical path length determine the cavity finesse and wavelength transmission characteristics of the etalon. The assemblies 30 should have a uniform thickness of each substrate along the long dimension of the assembly. If micro etalon optical elements are desired without any attached additional circuitry, the assemblies shown in FIG. 9 (without the filter coating 28) should be cut but in the transverse direction across each of the spacers to form an array of discrete micro etalons. Each of the etalon cavities in the composite shown in FIG. 4 may also be tested at many locations along the longitudinal length of each cavity for accuracy. For example, if the frequency of the signal is between 1525 nm and 1565 nm, then the etalon might produce, for example, four peaks at four frequencies between 1525 nm and 1565 nm. The linear filter would provide the information necessary to identify the frequency peak for the signal. If further polishing in any area is needed, the top substrate may be removed and replaced after re-polishing as necessary. The step of reducing the thickness of each of the top and bottom substrates to the minimum thickness (of for example 1 mm to 2 mm) should be done after the composite of FIG. 14 is precisely adjusted to be as optically consistent throughout as necessary. In further embodiments, any of the surfaces may further include anti-reflective coatings to reduce back reflection at the interface of two substrates, particularly if the substrates have different indices of reflection. The linear filter may be a thin film multiplayer coating with a spectral response linear in transmission and/or reflection. Such a multiplayer coating is complex in the sense that there may be 5-40 layers in total, using 2-4 materials (usually only 2), which are typically silica, tantala, titania, silicon oxynitride, magnesium floride, silicon for the 1.5-1.7 μm spectral region. The other complexity of this thin film design is that every layer is of a different thickness. These coatings are difficult to manufacture and require tight control of the process parameters of the coating chamber.

Figure 10:
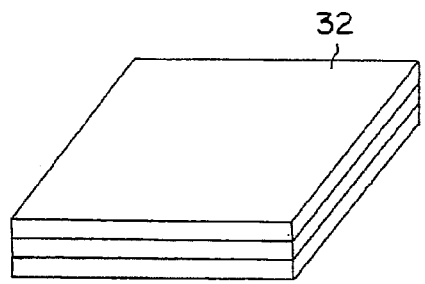
FIG. 10 shows an illustrative view of a composite used to form another composite substrate in accordance with an embodiment of the action.
Figure 11:
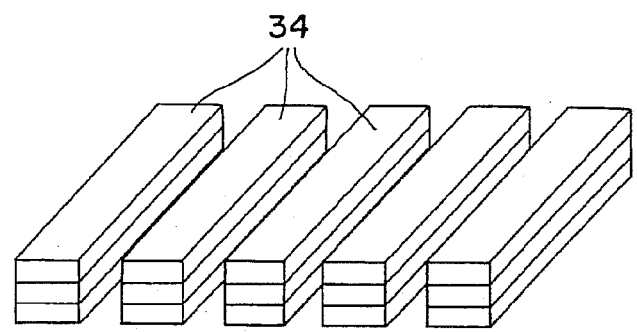
FIG. 11 shows an illustrative view of the composite substrate of FIG. 10 divided into a plurality of composite substrates.
Figure 12:
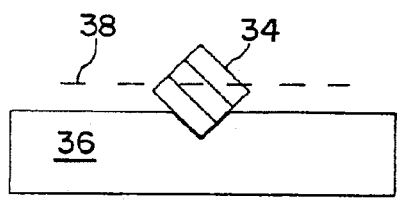
FIGS. 12 and 13 show illustrative views of a composite substrate of FIG. 11 being processed.
Figure 13:
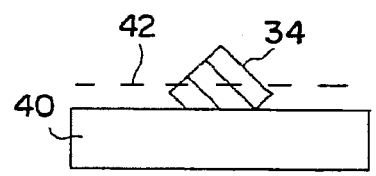
Figure 15:
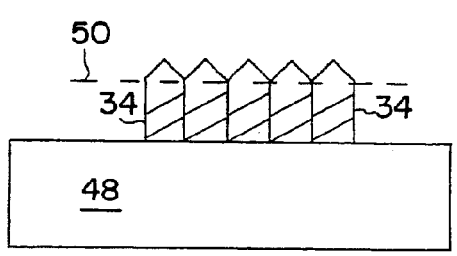

As shown in FIGS. 10-15, another optical element may be formed as a pair of beam splitters. As shown in FIG. 10, a composite 32 of three layers of $SiO_2$ material, measuring 50 mm by 50 mm by 8 mm is divided into elongated portions 34 as shown in FIG. 11. Each portion 34 is then placed into a wedge block 36 and the portion 34 is cut along the line generally indicated at 38. The piece is then placed onto a flat block 40 and the opposite corner of the piece is then cut along the line generally indicated at 42. The remaining portions of the pieces 34 are then collected, and are arranged together for stability and placed on a block 44 as shown in FIG. 14 where they are further cut along a line generally indicated at 46. The pieces are then inverted and placed on another block 48 where they are cut along the line generally indicated at 50 as shown in FIG. 15. In various embodiments, the inside surfaces of any of the substrates that form the composite 32 may be uniformly coated to provide specific transmission characteristics. Without any such coatings, the beam splitters may provide about 4% to 5% reflection in the direction transverse to the direction of the incident signal.

Figure 16:
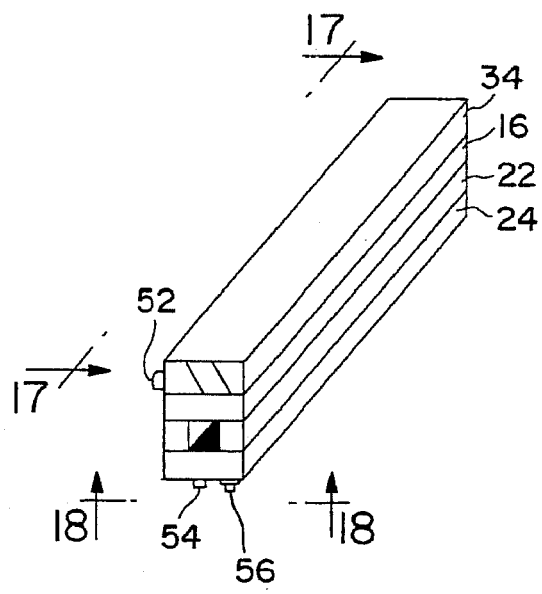
FIG. 16 shows an illustrative view of a composite optical structure in accordance with an embodiment of the invention.
Figure 17:
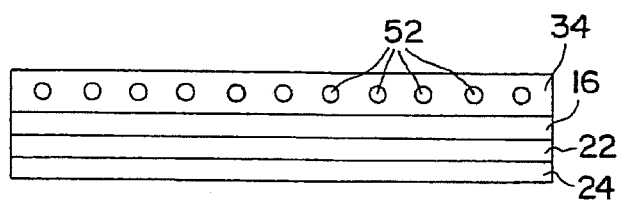
FIG. 17 shows an illustrative bottom view of the composite optical structure shown in FIG. 16 taken along line 17-17 thereof.
Figure 18:
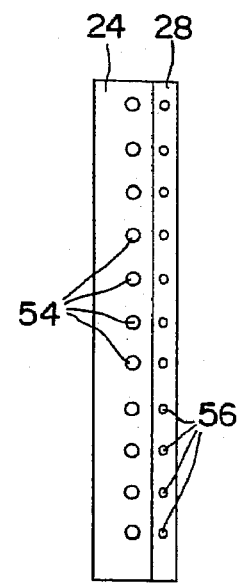
FIG. 18 shows an illustrative side view of the composite optical structure shown in FIG. 16 taken along line 18-18 thereof.
Figure 19:
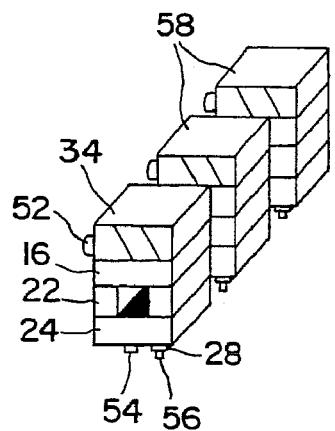
FIG. 19 shows an illustrative view of several composite optical assemblies in accordance with an embodiment of the invention.

Each fully trimmed portion 34 may then be optically contacted with a composite substrate of FIG. 9 as shown in FIG. 16 to provide a composite optical structure. The matching of the lengths (and possibly widths) permits the two substrates to be easily aligned when combined. The sizes of the original substrates 14, 16, 24 and 32 are chosen to be consistent to permit the composite optical structures to be easily and accurately aligned with one another. Certain additional optical elements may be added to the structure, such as lenses 52 and signal detectors 54 and 56 (such as InGaAs detectors) as shown in the side and bottom views of FIGS. 17 and 18. As shown in FIG. 19, each composite optical structure may then be divided into a plurality of optical assemblies 58, each of which provides a complete optical circuit. The optical assemblies may each be, for example, 6 mm by 4 mm=by 3 mm.

Figure 20:
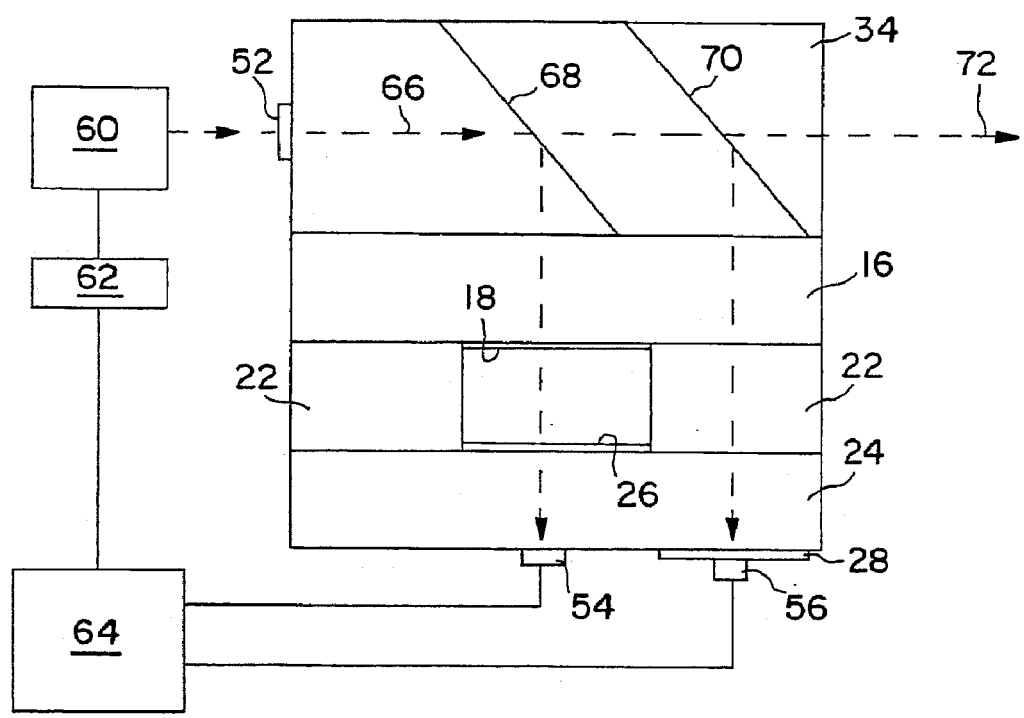
FIG. 20 shows an illustrative diagrammatic view of an optical assembly in accordance with the invention in a laser frequency locker system.
Figure 21:
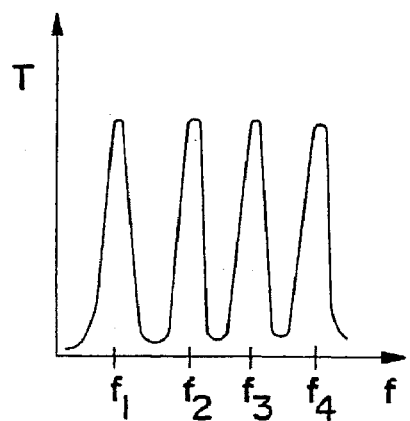
FIG. 21 shows an illustrative graphical view of the relationship between the frequency versus intensity of a signal received at the etalon detector in FIG. 20.
Figure 22:
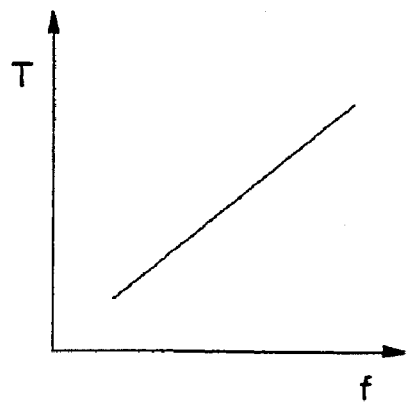
FIG. 22 shows an illustrative graphical view of the relationship between the wavelength and the signal received at the filter detector in FIG. 20.

Each optical assembly 58 may be coupled to a laser 60, a thermo electric cooler 62, and a controller 64 as shown diagrammatically in FIG. 20. The system of FIG. 20 provides a laser frequency locker circuit that detects any drift in output frequency of a laser and corrects the laser accordingly. In particular, a laser 60 outputs a signal 66 that is passed through a lens 52 and then divided at a first beam splitter 68 where a portion (e.g., 5%) of the signal is directed toward the etalon, which includes a pair of parallel flat surfaces coated with the reflective material 18 and 26. The laser signal 60 that passes through the beam splitter 68 encounters another beam splitter 70, and a portion (e.g., 5%) of the signal is diverted toward a wavelength selective filter formed by the path through the etalon spacer and including the filter coating 28. In various embodiments, the filter coating may be applied on any of a variety of the surfaces with in the etalon, such as on either side of the spacer 22. The diverted signal from the etalon is received by the etalon detector 54, and the diverted signal from the filter 56 are both coupled to the controller 64. The output of the controller 64 is coupled to the thermoelectric cooler 62 for the laser, and cause the laser temperature to be adjusted to correct for any variation in frequency. The output signal of the system is provided at 72. The etalon filter provides a transmission versus frequency response as generally shown in FIG. 21 where a number of frequency peaks are provided, and the filter provides a transmission versus frequency response as generally shown in FIG. 22 that is linear. The combination permits the system to discern which side of which peak the etalon response lies on.

Figure 23:
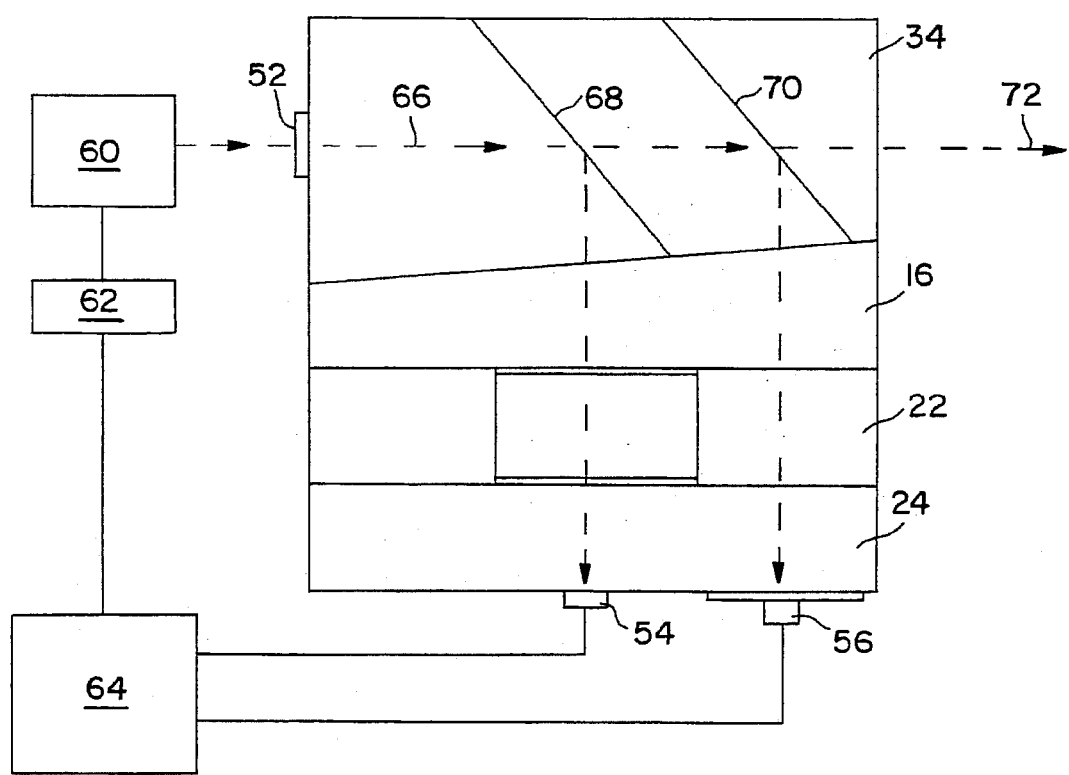
FIGS. 23-26 show illustrative diagrammatic views of an optical assemblies in accordance with further embodiments of the invention.

The system shown in FIG. 23 is similar to the system as shown in FIG. 22 except that the top surface of the etalon is cut at an angle, and the bottom surface of the beam splitter element is also cut at an angle that complements the angle of the etalon. These cuts are performed by placing the assemblies 30 and the trimmed portions 34 on an angled bock and then cutting the assemblies prior to joining the composite substrates together as shown in FIG. 16. The non-normal angle at the interface of the optical elements prevents back reflection of the signal at the interface of the beam splitter element and the etalon from traveling along the optical path back to the laser. In further embodiments, other surfaces such as the exposed surface of either of the substrates 34 and/or 24 may also be cut to the wedge shape to further inhibit back reflection and to permit the thickness of the respective substrate to be uniform.

Figure 24:
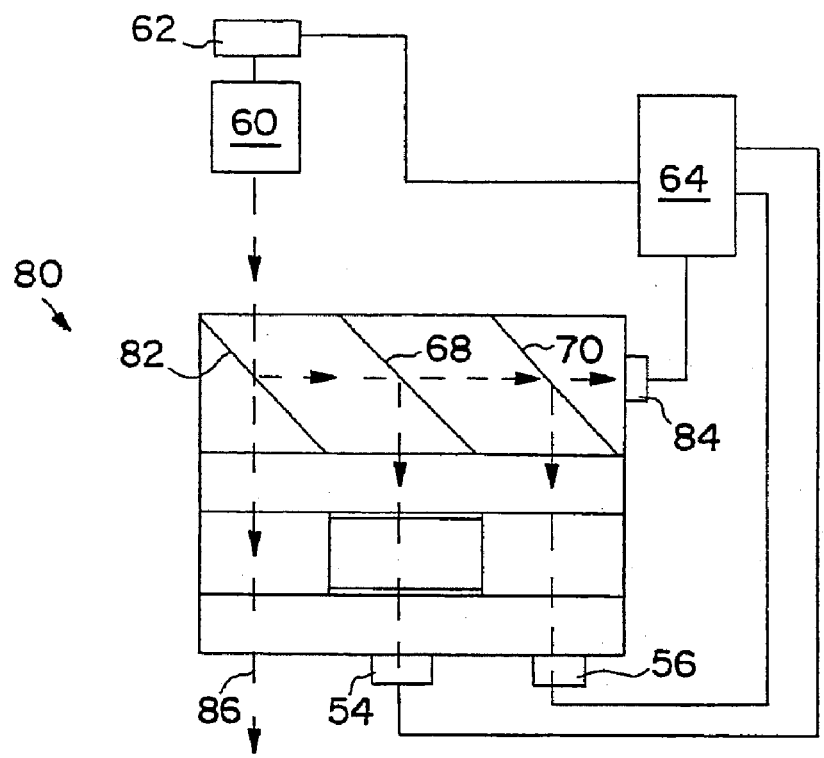

As shown in FIG. 24, a system 80 in accordance with another embodiment of the invention includes a laser 60, cooler 62 and controller 64 as discussed above. The system 80, however, inputs the laser signal through a different side of the assembly to an initial beam splitter 82. This permits the signal from the second beam splitter 70 to also be captured and detected at a detector 84, the information of which is transmitted to the controller 64. The system output signal is provided at 86. The second beam splitter 70 functions as a filter beam splitter providing a signal intensity response that is the inverse of the response received at the detector 56. In particular, the response will be in the inverse of the response shown in FIG. 22, such that the sum adds to unity.

Figure 25:
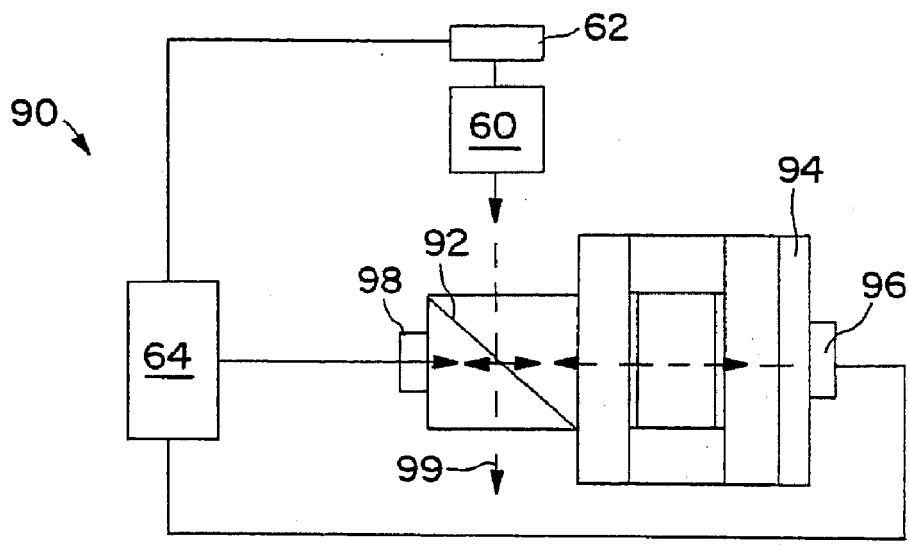

FIG. 25 shows another embodiment of a system 90 in accordance with another embodiment of the invention in which a laser signal from laser 60 is passed through a beam splitter 92 and a portion is diverted to an etalon filter and then through a filter 94 to a detector 96 as shown. A portion of the signal is also reflected back toward the beam splitter 92, and a portion of the signal is then received at another detector 98. The system output signal is provided at 99. If the filter 94 is an air gas etalon having a spacing of 4.8 microns, the filter response may be slightly sinusoidal. Such a system may have a free spectral range of at least 10 THz and a finesse of about 3.5. It operates in a mode similar to the linear filter, and provides a mathematically well-defined Airy function response of the etalon to locate any International Telecommunications Union (ITU) channel within a given range. In the notch or absorption filter mode of operation, the laser is tuned over a wavelength region containing an absorption response. This is either in the form of a temperature-stabilized thin film notch filter or an absorption in the etalon plate (e.g., Erbium-doped) or a gas-filled etalon cavity (e.g., acetylene). As the laser is tuned over this wavelength reference, the absorption dips are registered and the etalon fringes are counted consecutively from that point onwards. The number of the ITU channel may be ascertained provided the etalon is tuned and stabilized to the ITU grid. In this design, the laser beam is tapped off by a BS 92 and passes through the etalon in series with a linear or etalon filter 94. The transmission signal at detector 96, and the reflection signal at detector 98 are the product of the etalon and filter 94 response functions, i.e., the intensity of the etalon peaks is modulated by the transfer function of 94. This aspect differs from the design shown in FIG. 24 where the etalon and linear filter responses are monitored separately. As in FIG. 24, the sum of the signals at 96 and 98 is a measure of the total signal power, and all signals are normalized to this value. The difference of the signals at 96 and 98 allows the determination of the wavelength, i.e., peak, through a specified calibration procedure. The circuit of FIG. 25 provides a relatively simple circuit that uses only two detectors in an efficient fashion.

Figure 26:
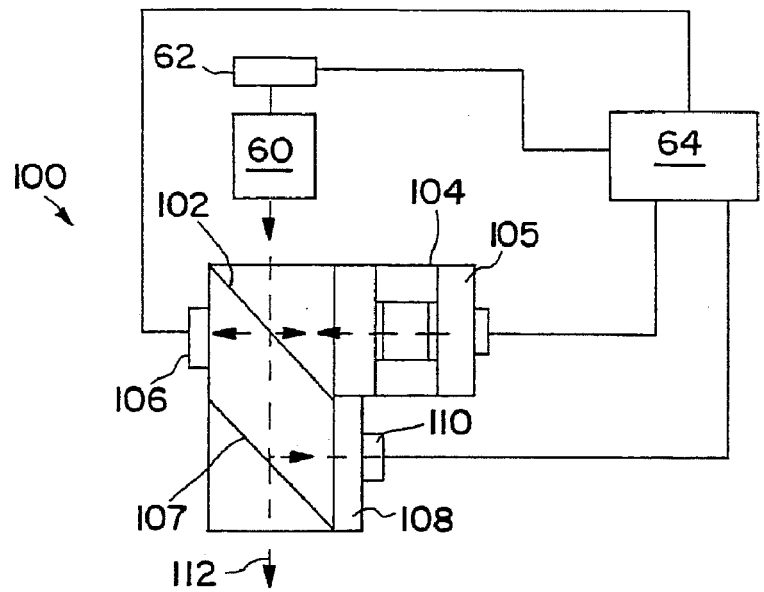

FIG. 26 shows another embodiment of a system 100 in accordance with another embodiment of the invention in which a laser signal is passed through a beam splitter 102 where it is diverted toward an etalon 104. Some of the etalon signal is reflected back toward the beam splitter 102 and passed to detector 106 as shown. The laser signal then passes through another beam splitter 107, and a portion of the signal passes through a linear filter 108 and is received by a detector 110. The system output is provided at 112. This device is based on the etalon peak counting method. As described above, the detector responses at 105 and 106 provide the total signal power. The beam is tapped again by splitter 107 and passes through a filter 108. The filter 108 may be a thin film narrow band pass filter (e.g., a notch or peak filter), a doped glass plate exhibiting absorption (e.g., by erbium), or a gas (e.g., acetylene) filled cavity exhibiting strong and sharp absorption lines. As the laser is tuned over a given frequency band encompassing the spectral features of filter 108, detector 110 will detect spectral dips/peaks whose frequency is accurately known, intrinsically as in the case of acetylene or erbium, or temperature controlled in the case of a thin film filter, thereby providing an accurate frequency reference. As the laser is scanned further, detector 105 picks up the etalon peaks that are counted sequentially.

Figure 27:
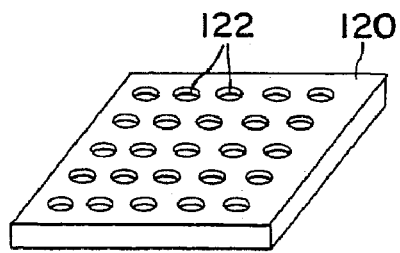
FIG. 27 shows an illustrative view of a spacer substrate used in accordance with a further embodiment of the invention.
Figure 28:
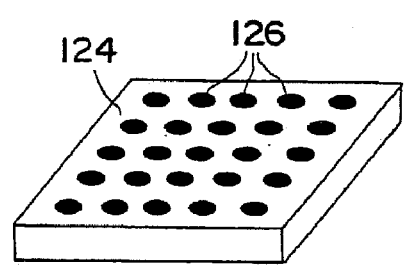
FIG. 28 shows an illustrative view of a first substrate used in accordance with a further embodiment of the invention.
Figure 29:
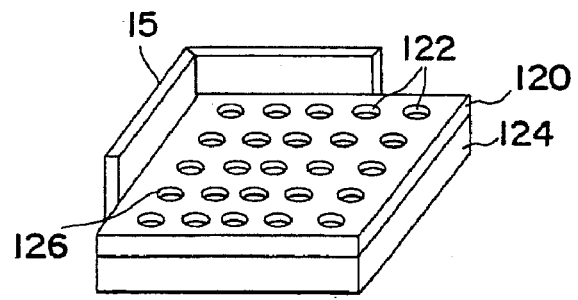
FIG. 29 shows an illustrative view of the spacer substrate of FIG. 27 inverted and placed onto the first substrate of FIG. 28 and then ground down to the spacer openings.
Figure 30:
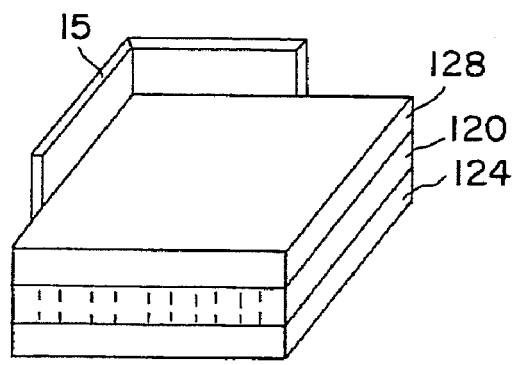
FIG. 30 shows an illustrative view of the composite of FIG. 29 with a second substrate similar to that shown in FIG. 28 placed onto the composite of FIG. 29.
Figure 31:
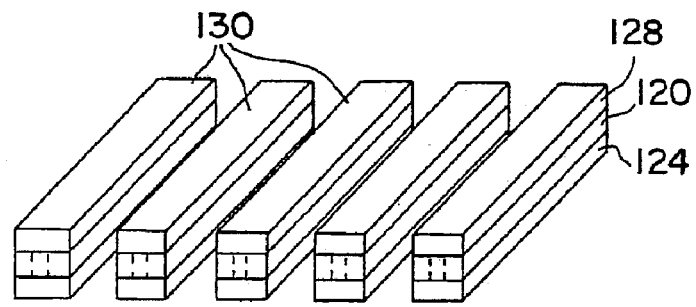
FIG. 31 shows an illustrative view of the composite of FIG. 30 divided into many composite substrates.
Figure 32:
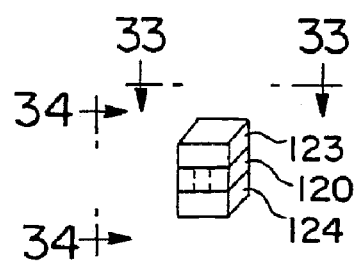
FIG. 32 shows an illustrative view of a composite optical element formed from the composite substrate of FIG. 31.
Figure 33:
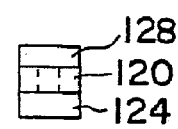
FIG. 33 shows an illustrative top view of the composite optical element shown in FIG. 32 taken along line 33-33 thereof.
Figure 34:
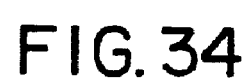
FIG. 34 shows an illustrative side view of the composite optical element shown in FIG. 32 taken along line 34-34 thereof.

FIGS. 27-33 show various stages of fabricating a sealed etalon. A spacer substrate 120 is provided with a plurality of openings or holes 122 as shown in FIG. 27, and this substrate is inverted and placed on top of a base substrate 124 (shown in FIG. 28) onto which reflective coating portions 126 have been deposited in a pattern of small circles matching the openings 122. Again, a block 15 is used for alignment purposes. The portions 126 match the openings 122 when the substrates are combined, and the exposed surface of the spacer substrate may be ground to a reduced thickness as discussed above in connection with FIG. 4 as shown in FIG. 29. A top substrate 128 similar to the substrate 124 with the reflective coatings 126 is then placed on top of the spacer substrate 120 as shown in FIG. 30, and the composite may be divided into elongated portions 130 as shown in FIG. 31. As shown in FIG. 32 each portion 130 may be divided into individual sealed micro etalons, each of which is generally cylindrically shaped as shown in the top view of FIG. 33 and the side view of FIG. 34.

Figure 35:
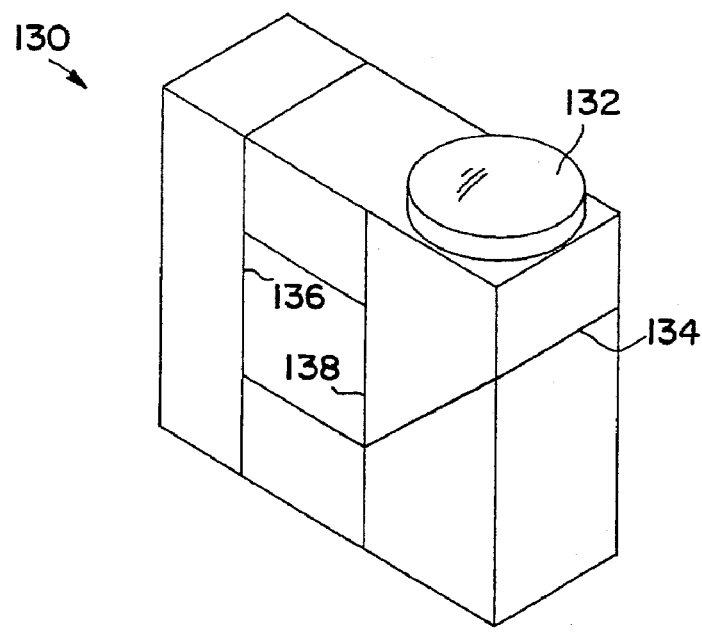
FIG. 35 shows an isometric view of a composite optical assembly in accordance with another embodiment of the invention.
Figure 36:
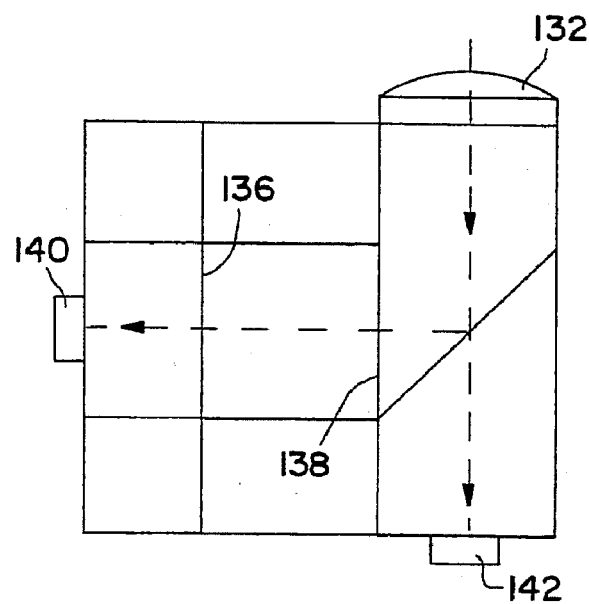
FIG. 36 shows a side view of the composite optical assembly of FIG. 35.

FIGS. 35 and 36 show another embodiment of an optical assembly 130 in accordance with the invention. The optical assembly 130 may be used as a laser end facet wavelocker and includes a collimating lens 132, a beam splitter 134 and an etalon cavity formed between etalon surfaces 136 and 138. Each of the length, width and height dimensions of the optical assembly may be less than about 1 cm, and preferably may be less than ½ cm, with the etalon cavity length determined by the etalon free spectral range (FSR) as discussed above.

The optical assembly 130 may be formed in accordance with the method discussed above with reference to FIGS. 1-19 except that the beam splitter optical element includes one instead of two beam splitters in each of the elongated portions 34. The assembly 130 is formed by combining optical elements into a composite optical structure that is then diced up to create a plurality of optical assemblies. As shown in FIG. 36, the optical assembly 130 also includes a pair of detectors 140 and 142 for capturing signals that emanate from each of the two directions from the beam splitter 134 as shown.

During use a back reflected signal from, for example a semiconductor laser, is collimated by the lens 132 and split by the beam splitter 134 into a first beam (e.g., 70%) that travels through the etalon formed by surfaces 136 and 138 to the first detector 140, and a second beam (e.g., 30%) that travels through the beam splitter 134 to the second detector 142. The circuit of the assembly 130 does not include a wavelength selective filter.

Figure 37:
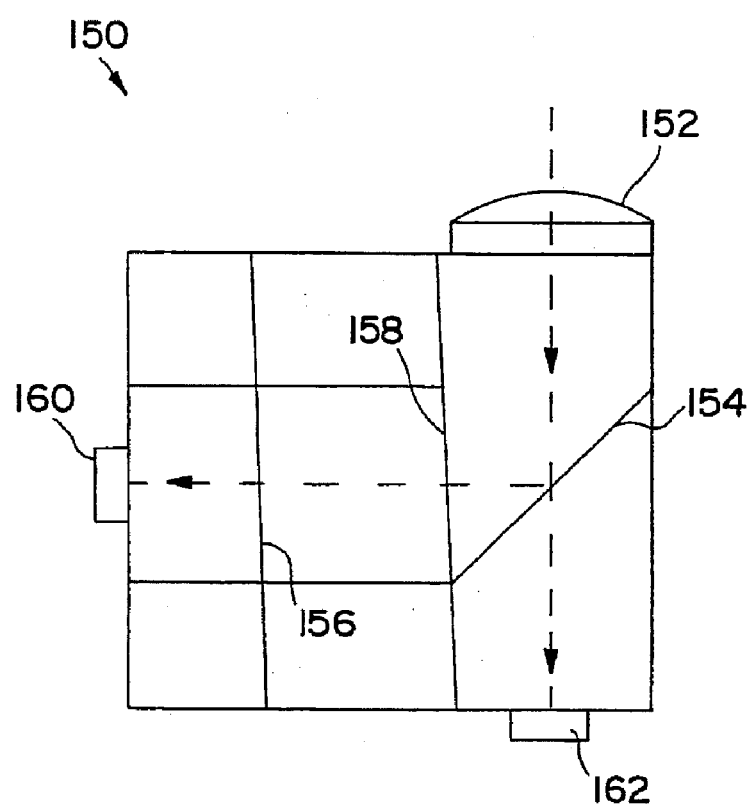
FIG. 37 shows a side view of a composite optical assembly in accordance with another embodiment of the invention The drawings are shown for illustrative purposes only and are not to scale.

FIG. 37 shows a side view of an optical assembly 150 including a collimating lends 152, a beam splitter 154, etalon surfaces 156 and 158, and detectors 160 and 162. The assembly 150 is similar to the assembly 130 shown in FIG. 36 except that the extended surfaces that form the etalon surfaces 156 and 158 are slightly non-normal to the direction of the signal beam from the beam splitter 154. This prevents back reflection into the laser from the etalon surfaces 156 and 158. The surfaces 156 and 158 are parallel with respect to one another and may be formed by using wedge blocks as discussed above with reference to FIG. 23. The optical elements and lens and detectors may be combined using optical contacting as discussed above and/or a wide variety of adhesive or other conventional bonding methods.

The substrates that form the end plates and spacers of the etalon may be formed of a material having a low thermal expansion and high refractive index homogeneity such as glass or glass ceramic. For example, the glass ceramic ZERODUR sold by Schott Glas of Mainz Germany may be used.

The invention provides stable alignment of micro optics in that optical contacting may be employed requiring no intermediate adhesive to affect dimensional stability. The devices of the invention are accurate because alignment of the long dimensions of the sub assemblies permits the optical elements to be easily and accurately aligned. The invention also permits bulk handling of the devices, i.e., simultaneous assembly of multiple devices. In particular, devices may be simultaneously assembled having optical paths in more than one plane. The bulk handling also facilitates testing in that sampling may be done while component parts are part of a monolithic structure and properties of inter-site parts may be accurately inferred. Further sealed or enclosed optical paths may be achieved which inhibit contamination. In fact, a complete enclosed-optical circuit may be provided for signal processing.

Although the above disclosed examples relate to wavelength locking circuits, optical circuits in accordance with the invention may be used for a wide variety of purposes, including but not limited to transmitters, multiplexors, interleavers, isolators, dispersion compensators, circulators, optical switches, turnable filters, wavelength routers, demultiplexors, attenuators, receivers, micro-optical wave meters, absolute wave meters, interferometers, micro-interferometers, and any other frequency or wavelength measuring component.

Also, micro circuits made in accordance with the invention that include etalons, beam splitters, filters, and/or sensors etc. need not only be used in the traditional optical infra-red through ultra violet wavelengths. Those skilled in the art will recognize that using suitable materials these constructions can be used to create circuits utilizing, any wave like radiation such as for example, microwave or X-ray wavelengths.

Those skilled in the art will appreciate that numerous modifications and variations may be made to the above disclosed embodiments without departing from the spirit and scope of the present invention.

What is claimed is:

1. A method of forming an optical circuit that includes at least two optical elements, said method comprising the steps of:

bonding together a first plurality of first component structures along a first plane to provide a first composite;

dividing the first composite into a plurality of first elongated optical assemblies;

bonding a second plurality of component structures together along a second plane to provide a second composite;

dividing the second composite into a plurality of second elongated optical assemblies;

aligning the first plurality of first elongated optical assemblies with a respective one of the second plurality of second elongated optical assemblies along a common alignment plane;

bonding each of the first plurality of first elongated optical assemblies to the respective one of the second plurality of second elongated optical assemblies along a bonding plane to form a composite structure; and dividing said composite structure into optical circuits along a plurality of cut planes along a plurality of mutually parallel planes such that each optical circuit includes a first optical element formed of first component structures that are bonded together along the first plane and a second optical element formed of second component structures that are bonded together along the second plane wherein the second plane that is not parallel with the first plane within each optical circuit.

2. The method as claimed in claim 1, wherein the alignment plane is perpendicular with respect to the bonding plane.

3. The method as claimed in claim 1, wherein the alignment plane is not perpendicular with respect to the bonding plane.

4. The method as claimed in claim 1, wherein the alignment plane for each of the plurality of first optical assemblies is provide by the step of dividing the first composite into the plurality of first elongated optical assemblies.

5. The method as claimed in claim 1, wherein each of said first elongated optical assemblies includes an opening that extends continuously along each first elongated optical assembly.

6. The method as claimed in claim 1, wherein each of said first elongated optical assemblies includes a plurality of openings such that the method provides that each optical circuit includes a sealed opening with the optical circuit.

7. The method as claimed in claim 1, wherein each of said first optical element includes a beam splitter and said second optical element includes an etalon.

8. The method as claimed in claim 7, wherein said etalon is an open etalon.

9. The method as claimed in claim 7, wherein said etalon is a closed etalon.

10. The method as claimed in claim 1, wherein said optical circuit is a wavelocker.

11. The method as claimed in claim 1, wherein said optical circuit includes an optical path, and wherein the bonding plane of each optical circuit along which the first component structures are bonded to the second component structures is not perpendicular with respect to the optical path through the bonding plane.

12. A method of forming an optical circuit that includes at least two optical elements, said method comprising the steps of:
    providing a first composite that includes a first plurality of first component structures that are bonded together along a first plane;
    dividing along a first plurality of parallel planes the first composite into a plurality of first elongated optical assemblies, each of said first plurality of parallel planes being perpendicular to said first plane;
    providing a second composite that includes a second plurality of second component structures that are bonded together along a second plane;
    dividing along a second plurality of parallel planes the second composite into a plurality of second elongated optical assemblies, each of said second plurality of parallel planes being non-perpendicular to said second plane;
    aligning the first plurality of first elongated optical assemblies with a respective one of the second plurality of second elongated optical assemblies along a common alignment plane, the alignment plane of each of said first and second elongated optical assemblies being provided by the respective steps of dividing the first and second composites;
    bonding each of the first plurality of first elongated optical assemblies to the respective one of the second plurality of second elongated optical assemblies along a bonding plane to form a composite structure, said bonding plane being non-parallel with at least one of the first and second planes; and
    dividing said composite structure into optical circuits along a plurality of cut planes along a plurality of mutually parallel planes such that each optical circuit includes a first optical element formed of first component structures that are bonded together along the first plane and a second optical element formed of second component structures that are bonded together along the second plane.

13. The method as claimed in claim 12, wherein the common alignment plane is perpendicular with respect to the bonding plane.

14. The method as claimed in claim 12, wherein the common alignment plane is not perpendicular with respect to the bonding plane.

15. The method as claimed in claim 12, wherein each of said first optical element includes a beam splitter and said second optical element includes an etalon.

16. The method as claimed in claim 12, wherein said optical circuit includes an optical path, and wherein the bonding plane of each optical circuit along which the first component structures are bonded to the second component structures is not perpendicular with respect to the optical path through the bonding plane.

17. A method of forming an optical circuit that includes at least two optical elements, said method comprising the steps of:
    bonding first component structures together along a first plane to form a first composite that includes a first plurality of first component structures that are bonded together along a first plane;
    dividing the first composite into a plurality of first elongated optical assemblies, each of which provides an etalon;
    bonding second component structures together along a second plane to form a second composite that includes a second plurality of second component structures that are bonded together along a second plane;
    dividing the second composite into a plurality of second elongated optical assemblies, each of which provides beam splitter;
    aligning the first plurality of first elongated optical assemblies with a respective one of the second plurality of second elongated optical assemblies along a common alignment plane;
    bonding each of the first plurality of first elongated optical assemblies to the respective one of the second plurality of second elongated optical assemblies along a bonding plane to form a composite structure; and
    dividing said composite structure into optical circuits along a plurality of cut planes along a plurality of mutually parallel planes such that each optical circuit includes a first optical element formed of first component structures that are bonded together along the first plane and a second optical element formed of second component structures that are bonded together along the second plane wherein the second plane that is not parallel with the first plane within each optical circuit.

18. The method as claimed in claim 17, wherein the common alignment plane is not perpendicular with respect to the bonding plane.

19. The method as claimed in claim 17, wherein said optical circuit includes an optical path, and wherein the bonding plane of each optical circuit along which the first component structures are bonded to the second component structures is not perpendicular with respect to the optical path through the bonding plane.

20. The method as claimed in claim 17, wherein said method further includes the step of attaching a plurality of third optical elements along an exposed surface of said composite structure in a periodic fashion such that when the composite structure is divided into optical circuits, each optical circuit includes at least one third optical element.

21. The method as claimed in claim 20, wherein said optical elements include at least one of lenses and signal detectors.

* * * * *